(12) United States Patent
Si et al.

(10) Patent No.: US 12,245,236 B2
(45) Date of Patent: Mar. 4, 2025

(54) METHOD AND APPARATUS OF DETERMINING CAP OF TRANSMISSION RESOURCES AVAILABLE FOR CONTROL INFORMATION AND COMMUNICATION APPARATUS

(71) Applicant: CHINA ACADEMY OF TELECOMMUNICATIONS TECHNOLOGY, Beijing (CN)

(72) Inventors: Qianqian Si, Beijing (CN); Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 98 days.

(21) Appl. No.: 16/960,184

(22) PCT Filed: Dec. 25, 2018

(86) PCT No.: PCT/CN2018/123487
§ 371 (c)(1),
(2) Date: Jul. 6, 2020

(87) PCT Pub. No.: WO2019/137203
PCT Pub. Date: Jul. 18, 2019

(65) Prior Publication Data
US 2020/0404649 A1    Dec. 24, 2020

(30) Foreign Application Priority Data

Jan. 11, 2018 (CN) .......................... 201810027450.8
Jan. 12, 2018 (CN) .......................... 201810032493.5

(51) Int. Cl.
H04W 72/21     (2023.01)
H04L 1/1812    (2023.01)
(Continued)

(52) U.S. Cl.
CPC .......... *H04W 72/21* (2023.01); *H04L 1/1812* (2013.01); *H04L 5/0048* (2013.01); *H04L 27/2601* (2013.01)

(58) Field of Classification Search
CPC ..... H04L 5/0053; H04L 5/003; H04L 1/1664; H04L 1/1812; H04L 1/1858;
(Continued)

(56) References Cited

U.S. PATENT DOCUMENTS 8,605,810 B2    12/2013    Papasakellariou et al.
2010/0195575 A1  8/2010    Papasakellariou et al.
(Continued)

FOREIGN PATENT DOCUMENTS

CN    102315897 A    1/2012
CN    103053121 A    4/2013
(Continued)

OTHER PUBLICATIONS

U.S. Appl. No. 62/455,541, filed Feb. 6, 2017 (Year: 2017).*
(Continued)

*Primary Examiner* — Sun Jong Kim
(74) *Attorney, Agent, or Firm* — Harness, Dickey & Pierce, P.L.C.

(57) ABSTRACT

Provided are a method and an apparatus of determining a cap of transmission resources available for control information and a communication device. The method of determining a cap of transmission resources available for control information includes: determining, according to a ratio coefficient, a cap of transmission resources to be occupied by coded modulation symbols of control information on a physical uplink shared channel (PUSCH).

13 Claims, 1 Drawing Sheet

11

Determining, according to a ratio coefficient, a cap of transmission resources to be occupied by coded modulation symbols of control information on a PUSCH (51) Int. Cl.
*H04L 5/00* (2006.01)
*H04L 27/26* (2006.01)

(58) Field of Classification Search
CPC . H04L 1/1896; H04L 5/0048; H04L 27/2601; H04L 5/0094; H04L 5/0044; H04L 5/0055; H04W 72/04; H04W 72/0413; H04W 72/1284
See application file for complete search history.

(56) References Cited

U.S. PATENT DOCUMENTS

| | | | |
|---|---|---|---|
| 2011/0299500 A1 | 12/2011 | Papasakellariou et al. | |
| 2011/0310986 A1* | 12/2011 | Heo | H04W 76/27 375/259 |
| 2013/0229998 A1 | 9/2013 | Noh et al. | |
| 2013/0235853 A1 | 9/2013 | Papasakellariou et al. | |
| 2013/0286948 A1* | 10/2013 | Gao | H04W 52/146 370/328 |
| 2015/0085794 A1* | 3/2015 | Chen | H04W 72/23 370/329 |
| 2016/0080129 A1* | 3/2016 | Jang | H04L 1/0067 370/329 |
| 2017/0318575 A1 | 11/2017 | Park et al. | |
| 2018/0278380 A1* | 9/2018 | Kim | H04L 1/1671 |
| 2018/0332577 A1 | 11/2018 | Yang et al. | |
| 2019/0007171 A1 | 1/2019 | Gao et al. | |
| 2019/0007182 A1* | 1/2019 | Li | H04L 1/007 |
| 2019/0037586 A1* | 1/2019 | Park | H04L 5/00 |
| 2019/0190663 A1* | 6/2019 | Sahlin | H04L 1/1812 |
| 2019/0215823 A1* | 7/2019 | Kim | H04L 1/0031 |
| 2020/0008191 A1* | 1/2020 | Wang | H04L 5/0091 |
| 2020/0275432 A1 | 8/2020 | Li et al. | |
| 2020/0374917 A1* | 11/2020 | Takeda | H04L 5/0055 |

FOREIGN PATENT DOCUMENTS

| | | |
|---|---|---|
| CN | 104272690 A | 1/2015 |
| CN | 103168441 B | 4/2016 |
| CN | 107005374 A | 8/2017 |
| JP | 2012-516616 A | 7/2012 |
| JP | 2013-533678 A | 8/2013 |
| JP | 2017-539124 A | 12/2017 |
| TW | 201705709 A | 2/2017 |
| WO | WO-2012/015227 A2 | 2/2012 |
| WO | WO-2015/115804 A1 | 8/2015 |
| WO | WO-2017/082696 A1 | 5/2017 |
| WO | WO-2019/095852 A1 | 5/2019 |

OTHER PUBLICATIONS

Chinese Office Action dated Sep. 21, 2020 for CN Application No. 201810032493.5.
Hisilicon Huawai, "On UCI multiplexing", Agenda Item 7.3.2.3, 3GPP TSG RAN WG1 Meeting #91, R1-1719397, Nov. 27-Dec. 1, 2017, Reno, USA.
International Preliminary Report on Patentability with Written Opinion of the International Search mailed Jul. 23, 2020 for International Patent Application No. PCT/CN2018/123487.
Taiwanese Office Action dated Nov. 20, 2019 for Application No. 108100499.
Extended European Search Report dated Jan. 21, 2021 for Application No. 18900294.2.
Ericsson, St-Ericsson, "Resource Allocation for UCI on PUSCH", TSG-RAN WG1 #61bis, R1-103845, Jun. 28-Jul. 2, 2010, Dresden, Germany.
Ericsson, St-Ericsson, "Resource Allocation for UCI on PUSCH", TSG-RAN WG1 #62bis, R1-104953, Aug. 23-27, 2010, Dresden, Germany.
Intel Corporation, "Remaining details for Polar coding", 3GPP TSG RAN WG1 Meeting #91, R1-1720103, Nov. 27-Dec. 1, 2017, Reno, NV, USA.
Japanese Office Action issued Nov. 2, 2021 for Japanese Patent Application No. 2020- 541580.
Korean Office Action issued Sep. 15, 2021 for Korean Application No. 10-2020-7021586.
3GPP TS 38.212, V15.0.0 (Dec. 2017) 3rd Generation Partnership Project; Technical Specification Group Radio Access Network; NR; Multiplexing and channel coding (Release 15).
RP-172760, List of RAN1 agreements, 3GPP TSG RAN #78, 3GPP (Dec. 21, 2017).

* cited by examiner

METHOD AND APPARATUS OF DETERMINING CAP OF TRANSMISSION RESOURCES AVAILABLE FOR CONTROL INFORMATION AND COMMUNICATION APPARATUS

CROSS-REFERENCE TO RELATED APPLICATIONS

The present application is a U.S. national phase application of a PCT Application No. PCT/CN2018/123487 filed on Dec. 25, 2018, which claims priorities to Chinese Patent Application No. 201810027450.8 filed in China on Jan. 11, 2018 and Chinese Patent Application No. 201810032493.5 filed in China on Jan. 12, 2018, disclosures of which are incorporated in their entirety by reference herein.

TECHNICAL FIELD

The present disclosure relates to the field of communication technology, in particular to a method and an apparatus of determining a cap of transmission resources available for control information, and a communication device.

BACKGROUND

With the evolution of requirements of mobile communication services, organizations such as the International Telecommunication Union (ITU) and the 3rd Generation Partnership Project (3GPP) have started to research new wireless communication systems (for example, $5^{th}$ Generation (5G) New Radio (NR) or 5G New radio access technology (RAT)). In the related 5G technologies, there is already a specific resource determination method (both a hybrid automatic repeat request acknowledgement (HARQ-ACK) and aperiodic channel state information (A-CSI) may be transmitted on a physical uplink shared channel (PUSCH) in an NR communication system) for transmission of control information on a PUSCH. However, in some scenarios, when a method in the related art is used for calculating resources available for control information, all PUSCH resources may be occupied by one type of control information, and as a result uplink-shared channel (UL-SCH) data or other control information cannot be transmitted.

For example, when a HARQ-ACK is mapped onto a PUSCH with UL-SCH data, if a quantity of bits of the HARQ-ACK is greater than that of the UL-SCH data, assuming that the quantity of bits of the HARQ-ACK is 64 and the quantity of bits of the UL-SCH data is 40, a quantity of coded modulation symbols of the HARQ-ACK calculated from a formula would be a cap value of the formula, that is, all PUSCH resources are used for transmitting the HARQ-ACK. If a base station intends to transmit both the HARQ-ACK and the UL-SCH data, the base station needs to allocate more physical resource blocks (PRBs) to user equipment (UE). However, according to the formula in the related art, even if the base station has allocated more PRBs to the UE, the UE would still spend all the PRBs on transmitting the HARQ-ACK, and the UL-SCH data cannot be transmitted.

A similar case also occurs in that when a HARQ-ACK is mapped onto a PUSCH without UL-SCH data, CSI may not be transmitted at the same time; or when CSI part 1 is mapped onto a PUSCH with UL-SCH data, the UL-SCH data and CSI part 2 may not be transmitted at the same time; or when CSI part 2 is mapped onto a PUSCH with UL-SCH data, the UL-SCH data may not be transmitted at the same time.

SUMMARY

The present disclosure provides in some embodiments a method of determining a cap of transmission resources available for control information, including:

determining, according to a ratio coefficient, a cap of transmission resources to be occupied by coded modulation symbols of control information on a PUSCH.

Optionally, the ratio coefficient is a ratio coefficient configured by a base station by using higher layer signaling.

Optionally, the ratio coefficient is greater than or equal to 0 and is less than or equal to 1.

Optionally, different uplink control information (UCI) types correspond to respective ratio coefficients, and the determining, according to the ratio coefficient, the cap of transmission resources to be occupied by coded modulation symbols of control information on the PUSCH includes:

determining a cap of transmission resources to be occupied by coded modulation symbols of control information of a UCI type on the PUSCH according to a ratio coefficient corresponding to the UCI type.

Optionally, different quantities of UCI bits correspond to respective ratio coefficients, and the determining, according to the ratio coefficient, the cap of transmission resources to be occupied by coded modulation symbols of control information on the PUSCH includes:

determining a cap of transmission resources to be occupied by coded modulation symbols of control information with a quantity of UCI bits on the PUSCH according to a ratio coefficient corresponding to the quantity of UCI bits.

Optionally, the step of determining, according to the ratio coefficient, the cap of transmission resources to be occupied by coded modulation symbols of control information on the PUSCH includes:

calculating, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi^{UCI}}(l)=|\Phi_l^{UCI}|$ represents a quantity of elements in a set $\Phi_l^{UCI}$, $\Phi_l^{UCI}$ is a set of resource units available for transmitting UCI in an orthogonal frequency-division multiplexing (OFDM) symbol l, l=0, 1, 2, . . . , $N_{symb,all}^{PUSCH}$−1 and $N_{symb,all}^{PUSCH}$ is a quantity of all OFDM symbols included in the PUSCH and includes a quantity of all symbols occupied by a demodulation reference signal (DMRS).

Optionally, the step of determining, according to the ratio coefficient, the cap of transmission resources to be occupied by coded modulation symbols of control information on the PUSCH includes:

calculating, when a CSI part 1 is mapped onto a PUSCH with UL-SCH data, a cap of a quantity of coded modulation symbols of CSI part 1 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK},$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l, l=0, 1, 2, ..., $N_{symb,all}^{PUSCH}-1$, and $\overline{M}_{sc,rvd}^{\Phi}(l)=|\overline{\Phi}_l^{rvd}|$ represents a quantity of elements in $\overline{\Phi}_l^{rvd}$; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$ and $N_{symb,all}^{PUSCH}$ is a quantity of all OFDM symbols included in the PUSCH and includes a quantity of all symbols occupied by a DMRS.

Optionally, the step of determining, according to the ratio coefficient, the cap of transmission resources to be occupied by coded modulation symbols of control information on the PUSCH includes:

calculating, when a CSI part 2 is mapped onto a PUSCH with UL-SCH data, a cap of a quantity of coded modulation symbols of CSI part 2 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1},$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ is a maximum quantity $N_{symb,max}^{UCI}$ of OFDM symbols used for transmitting the HARQ-ACK on the PUSCH, and $N_{symb,max}^{UCI}$ is a value predefined in a protocol or configured by a base station by using higher layer signaling and is less than or equal to $N_{symb,all}^{PUSCH}$.

The present disclosure provides in some embodiments a communication device, including: a storage, a processor, and a program stored in the storage and configured to be executed by the processor, where the processor is configured to execute the program to implement the following step:

determining, according to a ratio coefficient, a cap of transmission resources to be occupied by coded modulation symbols of control information on a PUSCH.

Optionally, the ratio coefficient is a ratio coefficient configured by a base station by using higher layer signaling.

Optionally, the ratio coefficient is greater than or equal to 0 and is less than or equal to 1.

Optionally, different UCI types correspond to respective ratio coefficients, and the processor is specifically configured to execute the program to implement the following step:

determining a cap of transmission resources to be occupied by coded modulation symbols of control information of a UCI type on the PUSCH according to a ratio coefficient corresponding to the UCI type.

Optionally, different quantities of UCI bits correspond to respective ratio coefficients, and the processor is specifically configured to execute the program to implement the following step:

determining a cap of transmission resources to be occupied by coded modulation symbols of control information with a quantity of UCI bits on the PUSCH according to a ratio coefficient corresponding to the quantity of UCI bits.

Optionally, the processor is specifically configured to execute the program to implement the following step:

calculating, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi^{UCI}}(l)=|\Phi_l^{UCI}|$ represents a quantity of elements in a set $\Phi_l^{UCI}$, $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, the processor is specifically configured to execute the program to implement the following step:

calculating, when a CSI part 1 is mapped onto a PUSCH with UL-SCH data, a cap of a quantity of coded modulation symbols of the CSI part 1 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK},$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\overline{\Phi}}(l),$$

where $\overline{\Phi}_l^{rvd}$ is a set of reserved resource units available for transmitting the HARQ-ACK in an OFDM symbol l l=0, 1, 2, ..., $N_{symb,all}^{PUSCH}-1$, and $\overline{M}_{sc,rvd}^{\overline{\Phi}}(l) = |\overline{\Phi}_l^{rvd}|$ represents a quantity of elements in $\overline{\Phi}_l^{rvd}$; and $M_{sc}^{\Phi^{UCI}}(l) = |\Phi_l^{UCI}|$ represents a quantity of elements in a set $\Phi_l^{UCI}$, where $\Phi_l^{UCI}$ is a set of resource units available for transmitting UCI in an OFDM symbol l, =0, 1, 2, ..., $N_{symb,all}^{PUSCH}-1$ and $N_{symb,all}^{PUSCH}$ is a quantity of all OFDM symbols included in the PUSCH and includes a quantity of all symbols occupied by a DMRS.

Optionally, the processor is specifically configured to execute the program to implement the following step:

calculating, when a CSI part 2 is mapped onto a PUSCH with UL-SCH data, a cap of a quantity of coded modulation symbols of CSI part 2 in each transport layer according to the following formula:

$$X = \left( \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1} \right),$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l) = |\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ is a maximum quantity $N_{symb,max}^{UCI}$ of OFDM symbols used for transmitting the HARQ-ACK on the PUSCH, and $N_{symb,max}^{UCI}$ is a value predefined in a protocol or configured by a base station by using higher layer signaling and is less than or equal to $N_{symb,all}^{PUSCH}$.

The present disclosure further provides in some embodiments a computer-readable storage medium storing therein a computer program, where the program is configured to be executed by a processor, to implement the steps in the foregoing method of determining a cap of transmission resources available for control information.

The present disclosure further provides in some embodiments an apparatus of determining a cap of transmission resources available for control information, including:

a first determination module, configured to determine, according to a ratio coefficient, a cap of transmission resources to be occupied by coded modulation symbols of control information on a PUSCH.

Optionally, the ratio coefficient is alternatively a ratio coefficient configured by a base station by using higher layer signaling.

Optionally, the ratio coefficient is greater than or equal to 0 and is less than or equal to 1.

Optionally, different UCI types correspond to respective ratio coefficients, and the first determination module includes:

a first determination submodule, configured to determine a cap of transmission resources to be occupied by coded modulation symbols of control information of a UCI type on the PUSCH according to a ratio coefficient corresponding to the UCI type.

Optionally, different quantities of UCI bits correspond to respective ratio coefficients, and the first determination module includes: a second determination submodule, configured to determine a cap of transmission resources to be occupied by coded modulation symbols of control information with a quantity of UCI bits on the PUSCH according to a ratio coefficient corresponding to the quantity of UCI bits.

Optionally, the first determination module includes:

a third determination submodule, configured to calculate, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi^{UCI}}(l) = |\Phi_l^{UCI}|$ represents a quantity of elements in a set $\Phi_l^{UCI}$, $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, the first determination module includes:

a fourth determination submodule, configured to calculate, when a CSI part 1 is mapped onto a PUSCH with UL-SCH data, a cap of a quantity of coded modulation symbols of the CSI part 1 in each transport layer according to the following formula:

$$X = \left( \left\lceil \left( \sum_{l=0}^{N_{symb,all}^{PUSCH}-1} M_{sc}^{\Phi^{UCI}}(l) \right) \times \text{ratio} \right\rceil - Q'_{ACK} \right),$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l l=0, 1, 2, . . . , $N_{symb,all}^{PUSCH}-1$, and $\overline{M}_{sc,rvd}^{\overline{\Phi}}(l)=|\overline{\Phi}_l^{rvd}|$ represents a quantity of elements in $\overline{\Phi}_l^{rvd}$; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, =0, 1, 2, . . . , $N_{symb,all}^{PUSCH}-1$ and $N_{symb,all}^{PUSCH}$ is a quantity of all OFDM symbols included in the PUSCH and includes a quantity of all symbols occupied by a DMRS.

Optionally, the first determination module includes:

a fifth determination submodule, configured to calculate, when a CSI part 2 is mapped onto a PUSCH with UL-SCH data, a cap of a quantity of coded modulation symbols of the CSI part 2 in each transport layer according to the following formula:

$$X = \left( \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1} \right),$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ is a maximum quantity $N_{symb,max}^{UCI}$ of OFDM symbols used for transmitting the HARQ-ACK on the PUSCH, and $N_{symb,max}^{UCI}$ is a value predefined in a protocol or configured by a base station by using higher layer signaling and is less than or equal to $N_{symb,all}^{PUSCH}$.

DETAILED DESCRIPTION

To make the technical solutions and characteristics of the present disclosure clearer, detailed descriptions are provided below with reference to the accompanying drawings and specific embodiments.

Figure 1:
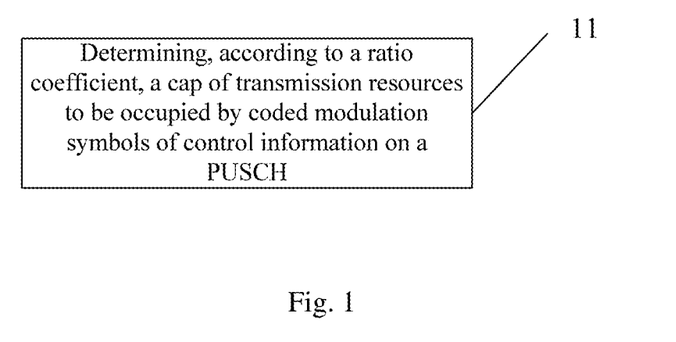
FIG. 1 is a schematic flowchart of a method of determining a cap of transmission resources available for control information according to an embodiment of the present disclosure.

In view of the problem in the related art that all PUSCH resources are occupied by one type of control information and as a result UL-SCH data or other control information cannot be transmitted, the present disclosure provides a method of determining a cap of transmission resources available for control information. The method is applicable to UE or a base station. As shown in FIG. 1, the determination method includes the following step.

A step 11 includes: determining, according to a ratio coefficient, a cap of transmission resources to be occupied by coded modulation symbols of control information on a PUSCH.

By means of the method of determining a cap of transmission resources available for control information provided in the embodiments of the present disclosure, a cap of transmission resources to be occupied by coded modulation symbols of control information on a PUSCH is determined according to a ratio coefficient, so that it can be avoided that all resource elements (REs) on the PUSCH are occupied by one type of control information, and the problem in the related art that all PUSCH resources are occupied by one type of control information and as a result UL-SCH data or other control information cannot be transmitted is adequately resolved.

The ratio coefficient is a ratio coefficient predefined in a protocol or configured by a base station by using higher layer signaling.

When the ratio coefficient is a ratio coefficient configured by a base station by using higher layer signaling, the base station needs to transmit the ratio coefficient to the UE. After receiving the ratio coefficient, the UE then determines, according to the received ratio coefficient, the cap of transmission resources to be occupied by coded modulation symbols of control information on the PUSCH.

Optionally, the ratio coefficient is greater than or equal to 0 and is less than or equal to 1.

In the embodiments of the present disclosure, different UCI types correspond to respective ratio coefficients, or different quantities of UCI bits correspond to respective ratio coefficients.

For the former case, different UCI types correspond to respective ratio coefficients, and the step of determining, according to the ratio coefficient, the cap of transmission resources to be occupied by coded modulation symbols of control information on the PUSCH includes: determining a cap of transmission resources to be occupied by coded modulation symbols of control information of a UCI type on the PUSCH according to a ratio coefficient corresponding to the UCI type.

For the latter case, different quantities of UCI bits correspond to respective ratio coefficients, and the step of determining, according to the ratio coefficient, the cap of transmission resources to be occupied by coded modulation symbols of control information on the PUSCH includes: determining a cap of transmission resources to be occupied by coded modulation symbols of control information with a quantity of UCI bits on the PUSCH according to a ratio coefficient corresponding to the quantity of UCI bits.

Three examples of the specific implementation of the step 11 in the embodiments of the present disclosure are provided hereinafter.

In the first example, the step of determining, according to the ratio coefficient, the cap of transmission resources to be occupied by coded modulation symbols of control information on the PUSCH includes: calculating, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi^{UCI}}(l) = |\Phi_l^{UCI}|$ represents a quantity of elements in a set $\Phi_l^{UCI}$, $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

In the second example, the step of determining, according to the ratio coefficient, the cap of transmission resources to be occupied by coded modulation symbols of control information on the PUSCH includes: when a CSI part 1 is mapped onto a PUSCH with UL-SCH data, calculating a cap of a quantity of coded modulation symbols of the CSI part 1 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK}, \text{ or}$$

$$X = \left\lceil \left( \sum_{l=0}^{N_{symb,all}^{PUSCH}-1} M_{sc}^{\Phi^{UCI}}(l) \right) - Q'_{ACK} \right) \times \text{ratio} \right\rceil,$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l, l=0, 1, 2, ..., $N_{symb,all}^{PUSCH}-1$, and $\overline{M}_{sc,rvd}^{\overline{\Phi}}(l) = |\overline{\Phi}_l^{rvd}|$ represents a quantity of elements in $\overline{\Phi}_l^{rvd}$; and $M_{sc}^{\Phi^{UCI}}(l) = |\Phi_l^{UCI}|$ represents a quantity of elements in a set $\Phi_l^{UCI}$, where $\Phi_l^{UCI}$ is a set of resource units available for transmitting UCI in an OFDM symbol l, =0, 1, 2, ..., $N_{symb,all}^{PUSCH}-1$ and $N_{symb,all}^{PUSCH}$ is a quantity of all OFDM symbols included in the PUSCH and includes a quantity of all symbols occupied by a DMRS.

In the third example, the step of determining, according to the ratio coefficient, the cap of transmission resources to be occupied by coded modulation symbols of control information on the PUSCH includes: when a CSI part 2 is mapped onto a PUSCH with UL-SCH data, a cap of a quantity of coded modulation symbols of the CSI part 2 in each transport layer is calculated according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1} \right), \text{ or}$$

$$X = \left\lceil \left( \sum_{l=0}^{N_{symb,all}^{PUSCH}-1} M_{sc}^{\Phi^{UCI}}(l) \right) - Q'_{ACK} - Q'_{CSI,1} \right) \times \text{ratio} \right\rceil,$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l) = |\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

$N_{symb,all}^{PUSCH}$ is a maximum quantity $N_{symb,max}^{UCI}$ of OFDM symbols used for transmitting the HARQ-ACK in the PUSCH, and $N_{symb,max}^{UCI}$ is a value predefined in a protocol or configured by a base station by using higher layer signaling and is less than or equal to $N_{symb,all}^{PUSCH}$.

The method of determining a cap of transmission resources available for control information provided in some embodiments of the present disclosure are further described below.

To address the foregoing technical problem, the present disclosure provides in some embodiments a method of determining a cap of transmission resources available for control information (the method is applicable to a base station or UE), in which a cap of transmission resources to be occupied by coded modulation symbols of control information on a PUSCH is determined according to a ratio coefficient, to avoid a case that all REs on the PUSCH are occupied by one type of control information.

The solution provided in the embodiments of the present disclosure mainly includes: determining, according to a ratio coefficient ratio, a cap of transmission resources to be occupied by coded modulation symbols of control information on a PUSCH. The solution specifically includes the following.

(1) ratio is a ratio coefficient predefined in a protocol or configured by using higher layer signaling. A value range of ratio is from 0 to 1. It is not excluded that ratio is equal to 1.

When ratio is a ratio coefficient configured by using higher layer signaling, the base station needs to inform the UE of the ratio.

(2) Different UCI types correspond to the same ratio value or different ratio values. Different quantities of UCI bits correspond to the same ratio value or different ratio values.

Optionally, different UCI types correspond to respective ratio coefficients, or different quantities of UCI bits correspond to respective ratio coefficients.

(3) When a HARQ-ACK is mapped onto a PUSCH with or without UL-SCH data, a cap of a quantity of coded modulation symbols of the HARQ-ACK in each transport layer is calculated according to the following formula:

$$x = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, $M_{sc}^{\Phi^{UCI}}(l) = |\Phi_l^{UCI}|$ is a quantity of elements in a set $\Phi_l^{UCI}$, $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ in the formula may be replaced with a maximum quantity $N_{symb,max}^{UCI}$ of OFDM symbols used for transmitting the HARQ-ACK on the PUSCH, and $N_{symb,max}^{UCI}$ is a value predefined in a protocol or configured by using higher layer signaling and is less than or equal to $N_{symb,all}^{PUSCH}$.

(4) When a CSI part 1 is mapped onto a PUSCH with UL-SCH data, a cap of a quantity of coded modulation symbols of the CSI part 1 in each transport layer is calculated according to the following formula:

$$x = \left\lceil \left( \sum_{l=0}^{N_{symb,all}^{PUSCH}-1} M_{sc}^{\Phi^{UCI}}(l) \right) \times \text{ratio} \right\rceil - Q'_{ACK}, \text{ or}$$

$$x = \left\lceil \left( \left( \sum_{l=0}^{N_{symb,all}^{PUSCH}-1} M_{sc}^{\Phi^{UCI}}(l) \right) - Q'_{ACK} \right) \times \text{ratio} \right\rceil,$$

X represents a cap value of the quantity of coded modulation symbols of the CSI part 1 in each transport layer;

if an quantity of information bits of a HARQ-ACK is greater than 2, $Q'_{ACK}$ is a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l, l=0, 1, 2, . . . , $N_{symb,all}^{PUSCH}-1$ and $\overline{M}_{sc,rvd}^{\Phi}(l) = |\overline{\Phi}_l^{rvd}|$ is a quantity of elements in $\overline{\Phi}_l^{rvd}$; and $M_{sc}^{\Phi^{UCI}}(l) = |\Phi_l^{UCI}|$ is a quantity of elements in a set $\Phi_l^{UCI}$, where $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ in the formula may be replaced with a maximum quantity $N_{symb,max}^{UCI}$ of OFDM symbols used for transmitting the HARQ-ACK on the PUSCH, and $N_{symb,max}^{UCI}$ is a value predefined in a protocol or configured by using higher layer signaling and is less than or equal to $N_{symb,all}^{PUSCH}$.

(5) When a CSI part 2 is mapped onto a PUSCH with UL-SCH data, a cap of a quantity of coded modulation symbols of the CSI part 2 in each transport layer is calculated according to the following formula:

$$X = \left\lceil \left( \left( \sum_{l=0}^{N_{symb,all}^{PUSCH}-1} M_{sc}^{\Phi^{UCI}}(l) \right) \times \text{ratio} \right) - Q'_{ACK} - Q'_{CSI,1} \right\rceil, \text{ or}$$

$$X = \left\lceil \left( \left( \sum_{l=0}^{N_{symb,all}^{PUSCH}-1} M_{sc}^{\Phi^{UCI}}(l) \right) - Q'_{ACK} - Q'_{CSI,1} \right) \times \text{ratio} \right\rceil,$$

X represents a cap value of the quantity of coded modulation symbols of the CSI part 2 in each transport layer;

if an quantity of information bits of a HARQ-ACK is greater than 2, $Q'_{ACK}$ is a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ is a quantity of coded modulation symbols of transmission of a CSI part 1 in each transport layer of the PUSCH; and $M_{sc}^{\Phi^{UCI}}(l) = |\Phi_l^{UCI}|$ is a quantity of elements in a set $\Phi_l^{UCI}$, where $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

Optionally, $N_{symb,all}^{PUSCH}$ in the formula may be replaced with a maximum quantity $N_{symb,max}^{UCI}$ of OFDM symbols used for transmitting the HARQ-ACK on the PUSCH, and N max is a value predefined in a protocol or configured by using higher layer signaling and is less than or equal to $N_{symb,all}^{PUSCH}$.

The solutions provided in the embodiments of the present disclosure are described exemplarily below.

Example 1

It is assumed that the base station uses radio resource control (RRC) signaling to configure a ratio coefficient of 0.2 for transmission of a HARQ-ACK on the PUSCH, a ratio coefficient of 0.4 for transmission of a CSI part 1 on the PUSCH, and a ratio coefficient of 0.6 for transmission of a CSI part 2 on the PUSCH. If the base station allocates 14 OFDM symbols and 2 resource blocks (RBs) for the PUSCH transmission, and a DMRS occupies a third OFDM symbol, then when l=0, 1, 3, 4, 5, 6, 7, 8, 9, 10, 11, 12, 13, $M_{sc}^{\Phi^{UCI}}(l)=24$, and when l=2, $M_{sc}^{\Phi^{UCI}}(l)=0$.

When a HARQ-ACK, a CSI part 1, a CSI part 2, and UL-SCH data are to be multiplexed and transmitted on the PUSCH, a cap X1 of a quantity of coded modulation symbols of the HARQ-ACK in each transport layer is calculated according to the following formula:

$$X1 = \left\lceil \sum_{l=0}^{N_{symb,all}^{PUSCH}-1} M_{sc}^{\Phi^{UCI}}(l) \times \text{ratio} \right\rceil,$$

and therefore a quantity of REs available for transmitting the HARQ-ACK on the PUSCH is $\lceil 3 \times 12 \times 2 \times 0.2 \rceil = 63$.

a cap X2 of a quantity of coded modulation symbols of the CSI part 1 in each transport layer is calculated according to the following formula:

$$X2 = \left\lceil \left( \sum_{l=0}^{N_{symb,all}^{PUSCH}-1} M_{sc}^{\Phi^{UCI}}(l) \right) \times \text{ratio} \right\rceil - Q'_{ACK},$$

and a quantity of REs available for transmitting the CSI part 1 on the PUSCH is $\lceil 13 \times 12 \times 2 \times 0.4 \rceil - 63 = 125 - 63 = 62$; and a cap X3 of a quantity of coded modulation symbols of the CSI part 2 in each transport layer is calculated according to the following formula:

$$X3 = \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1},$$

and a quantity of REs available for transmitting the CSI part 2 on the PUSCH is $\lceil 13 \times 12 \times 2 \times 0.6 \rceil - 63 - 62 = 188 - 63 - 62 = 63$.

After the foregoing REs used for transmitting control information are deducted, a total of $312 - 63 - 62 - 63 = 124$ remaining REs can be used for transmitting the UL-SCH data.

Example 2

It is assumed that the base station uses RRC signaling to configure a ratio coefficient of 0.2 for transmission of a HARQ-ACK on the PUSCH, a ratio coefficient of 0.3 for transmission of a CSI part 1 on the PUSCH, and a ratio coefficient of 0.4 for transmission of a CSI part 2 on the PUSCH. If the base station allocates 14 OFDM symbols and 2 RBs for the PUSCH transmission, and a DMRS occupies a third OFDM symbol, then when $l=0, 1, 3, 4, 5, 6, 7, 8, 9, 10, 11, 12, 13$, $M_{sc}^{\Phi^{UCI}}(l)=24$, and when $l=2$, $M(l)=0$.

When a HARQ-ACK, a CSI part 1, a CSI part 2, and UL-SCH data are to be multiplexed and transmitted on the PUSCH, a cap X1 of a quantity of coded modulation symbols of the HARQ-ACK in each transport layer is calculated according to the following formula:

$$X1 = \left\lceil \sum_{l=0}^{N_{symb,all}^{PUSCH}-1} M_{sc}^{\Phi^{UCI}}(l) \times \text{ratio} \right\rceil,$$

and therefore a quantity of REs available for transmitting the HARQ-ACK on the PUSCH is $\lceil 13 \times 12 \times 2 \times 0.2 \rceil = 63$;

a cap X2 of a quantity of coded modulation symbols of the CSI part 1 in each transport layer is calculated according to the following formula:

$$X2 = \left\lceil \left( \sum_{l=0}^{N_{symb,all}^{PUSCH}-1} M_{sc}^{\Phi^{UCI}}(l) \right) - Q'_{ACK} \right) \times \text{ratio} \right\rceil,$$

and a quantity of REs available for transmitting the CSI part 1 on the PUSCH is $\lceil (13 \times 12 \times 2 - 63) \times 0.3 \rceil = 75$; and a cap X3 of a quantity of coded modulation symbols of the CSI part 2 in each transport layer is calculated according to the following formula:

$$X3 = \left\lceil \left( \left( \sum_{l=0}^{N_{symb,all}^{PUSCH}-1} M_{sc}^{\Phi^{UCI}}(l) \right) - Q'_{ACK} - Q'_{CSI,1} \right) \times \text{ratio} \right\rceil,$$

and a quantity of REs available for transmitting the CSI part 2 on the PUSCH is $\lceil (13 \times 12 \times 2 - 63 - 75) \times 0.4 \rceil = 70$.

After the foregoing REs used for transmitting control information are deducted, a total of $312 - 63 - 75 - 70 = 104$ remaining REs can be used for transmitting the UL-SCH data.

Example 3

It is assumed that the base station uses RRC signaling to configure a ratio coefficient of 0.5 for transmission of control information on the PUSCH, when a HARQ-ACK is mapped onto a PUSCH with UL-SCH data for transmission, a cap X1 of a quantity of coded modulation symbols of the HARQ-ACK in each transport layer is calculated according to the following formula:

$$X1 = \left\lceil \sum_{l=0}^{N_{symb,max}^{UCI}-1} M_{sc}^{\Phi^{UCI}}(l) \times \text{ratio} \right\rceil.$$

When the base station allocates 14 OFDM symbols and 2 RBs for the PUSCH transmission, if a DMRS occupies a third OFDM symbol, then when $l=0, 1, 3, 4, 5, 6, 7, 8, 9, 10, 11, 12, 13$, $M_{sc}^{\Phi^{UCI}}(l)=24$, and when $l=2$, $M_{sc}^{\Phi^{UCI}}(l)=0$.

Assuming that $N_{symb,max}^{UCI}$ is a value of 7 predefined in a protocol, the quantity of REs available for transmitting the HARQ-ACK on the PUSCH is $\lceil 7 \times 12 \times 2 \times 0.5 \rceil = 84$, and the remaining 228 REs may be used for transmitting UL-SCH data.

As can be known from above, during transmission of control information on a PUSCH according to the related 5G technology, in some scenarios, when a method in the related art is used for calculating resources available for control information, all PUSCH resources may be occupied by one type of control information, and as a result UL-SCH data or other control information cannot be transmitted. By using the solution provided in the embodiments of the present disclosure, a case that all REs on the PUSCH are occupied by one type of control information is avoided, and control information and data can be properly multiplexed and transmitted on a PUSCH in NR, thereby ensuring the performance of an NR system.

A person skilled in the art may understand that all or a part of the steps of the embodiments may be implemented by hardware or a computer program configured to instruct relevant hardware. The computer program includes instructions for performing some or all steps in the foregoing method. The computer program may be stored in a readable storage medium. The storage medium may be a storage medium in any form.

Figure 2:
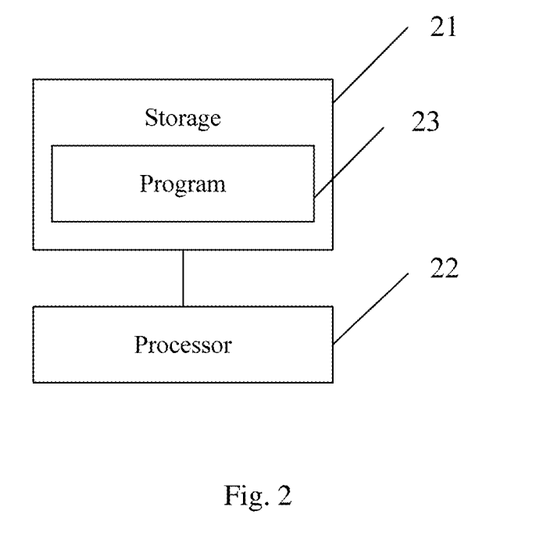
FIG. 2 is a schematic structural diagram of a communication device according to an embodiment of the present disclosure.

The present disclosure further provides in some embodiments a communication device (which may be UE or a base station), and as shown in FIG. 2, the communication device includes: a storage 21, a processor 22, and a program 23 stored in the storage 21 and configured to be executed by the processor 22, where the processor 22 is configured to execute the program to implement the following step:

determining, according to a ratio coefficient, a cap of transmission resources to be occupied by coded modulation symbols of control information on a PUSCH.

By means of the communication device in the embodiments of the present disclosure, a cap of transmission resources to be occupied by coded modulation symbols of control information on a PUSCH is determined according to a ratio coefficient, so that it can be avoided that all REs on the PUSCH are occupied by one type of control information, and the problem in the related art that all PUSCH resources are occupied by one type of control information and as a result UL-SCH data or other control information cannot be transmitted is adequately resolved.

The ratio coefficient is a ratio coefficient predefined in a protocol or configured by a base station by using higher layer signaling.

When the communication device is UE, corresponding to a case in which the ratio coefficient is a ratio coefficient configured by a base station by using higher layer signaling, this solution further includes: receiving the ratio coefficient transmitted by the base station.

When the communication device is a base station, corresponding to a case in which the ratio coefficient is a ratio coefficient configured by the base station by using higher layer signaling, this solution further includes: configuring and transmitting the ratio coefficient to the UE by using higher layer signaling.

When the solution involves a receiving or transmission action, the communication device may further include a transceiver. The transceiver may include a plurality of elements, that is, a transmitter and a receiver, to provide units for communicating with various other devices over a transmission medium.

Optionally, the ratio coefficient is greater than or equal to 0 and is less than or equal to 1.

In the embodiments of the present disclosure, different UCI types correspond to respective ratio coefficients, or different quantities of UCI bits correspond to respective ratio coefficients.

For the former case, different UCI types correspond to respective ratio coefficients, and the processor is specifically configured to execute the program to implement the following step: determining a cap of transmission resources to be occupied by coded modulation symbols of control information of a UCI type on the PUSCH according to a ratio coefficient corresponding to the UCI type.

For the latter case, different quantities of UCI bits correspond to respective ratio coefficients, and the processor is specifically configured to execute the program to implement the following step: determining a cap of transmission resources to be occupied by coded modulation symbols of control information with a quantity of UCI bits on the PUSCH according to a ratio coefficient corresponding to the quantity of UCI bits.

According to the embodiments of the present disclosure, three examples of the specific implementation of "determining, according to the ratio coefficient, a cap of transmission resources to be occupied by coded modulation symbols of control information on a PUSCH" are provided hereinafter.

In the first example, the processor is specifically configured to execute the program to implement the following step: calculating, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi_{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi_{UCI}}(l)=|\Phi_l^{UCI}|$ represents a quantity of elements in a set $\Phi_l^{UCI}$, $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

In the second example, the processor is specifically configured to execute the program to implement the following step: calculating, when a CSI part 1 is mapped onto a PUSCH with UL-SCH data, a cap of a quantity of coded modulation symbols of the CSI part 1 in each transport layer according to the following formula:

$$X = \left\lceil \left( \sum_{l=0}^{N_{symb,all}^{PUSCH}-1} M_{sc}^{\Phi_{UCI}}(l) \right) \times \text{ratio} \right\rceil - Q'_{ACK}, \text{ or}$$

$$X = \left\lceil \left( \left( \sum_{l=0}^{N_{symb,all}^{PUSCH}-1} M_{sc}^{\Phi_{UCI}}(l) \right) - Q'_{ACK} \right) \times \text{ratio} \right\rceil,$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l, l=0, 1, 2, . . . , $N_{symb,all}^{PUSCH}-1$, and $\overline{M}_{sc,rvd}^{\Phi}(l)=|\overline{\Phi}_l^{rvd}|$ represents a quantity of elements in $\overline{\Phi}_l^{rvd}$; and $M_{sc}^{\Phi_{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

In the third example, the processor is specifically configured to execute the program to implement the following step: calculating, when a CSI part 2 is mapped onto a PUSCH with UL-SCH data, a cap of a quantity of coded modulation symbols of the CSI part 2 in each transport layer according to the following formula:

$$X = \left\lfloor \left( \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1} \right) \right\rfloor, \text{ or}$$

$$X = \left\lfloor \left( \left\lceil \left( \sum_{l=0}^{N_{symb,all}^{PUSCH}-1} M_{sc}^{\Phi^{UCI}}(l) \right) - Q'_{ACK} - Q'_{CSI,1} \right\rceil \times \text{ratio} \right) \right\rfloor,$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l) = |\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

$N_{symb,all}^{PUSCH}$ is a maximum quantity $N_{symb,max}^{UCI}$ of OFDM symbols used for transmitting the HARQ-ACK on the PUSCH, and $N_{symb,max}^{UCI}$ is a value predefined in a protocol or configured by a base station by using higher layer signaling and is less than or equal to $N_{symb,all}^{PUSCH}$.

The foregoing implementations of the method of determining a cap of transmission resources available for control information are all applicable to the embodiment of the communication device, and can achieve the same technical effects.

The present disclosure further provides in some embodiments a computer-readable storage medium storing therein a computer program, where the program is configured to be executed by a processor, to implement steps in the foregoing method of determining a cap of transmission resources available for control information.

The foregoing implementations of the method of determining a cap of transmission resources available for control information are all applicable to the embodiment of the computer-readable storage medium, and can achieve the same technical effects.

Figure 3:
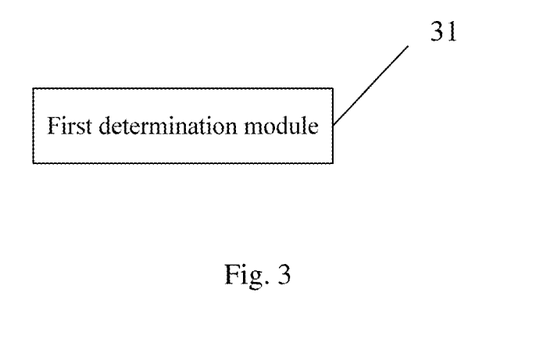
FIG. 3 is a schematic structural diagram of an apparatus of determining a cap of transmission resources available for control information according to an embodiment of the present disclosure.

The present disclosure further provides in some embodiments an apparatus of determining a cap of transmission resources available for control information, and as shown in FIG. 3, the apparatus includes:

a first determination module 31, configured to determine, according to a ratio coefficient, a cap of transmission resources to be occupied by coded modulation symbols of control information on a PUSCH.

By means of the apparatus of determining a cap of transmission resources available for control information provided in the embodiments of the present disclosure, a cap of transmission resources to be occupied by coded modulation symbols of control information on a PUSCH is determined according to a ratio coefficient, so that it can be avoided that all REs on the PUSCH are occupied by one type of control information, and the problem in the related art that all PUSCH resources are occupied by one type of control information and as a result UL-SCH data or other control information cannot be transmitted is adequately resolved.

The ratio coefficient is a ratio coefficient predefined in a protocol or configured by a base station by using higher layer signaling.

When the ratio coefficient is a ratio coefficient configured by a base station by using higher layer signaling, the base station needs to transmit the ratio coefficient to the UE. After receiving the ratio coefficient, the UE then determines, according to the received ratio coefficient, the cap of transmission resources to be occupied by coded modulation symbols of control information on the PUSCH.

Optionally, the ratio coefficient is greater than or equal to 0 and is less than or equal to 1.

In the embodiments of the present disclosure, different UCI types correspond to respective ratio coefficients, or different quantities of UCI bits correspond to respective ratio coefficients.

For the former case, different UCI types correspond to respective ratio coefficients, and the first determination module includes: a first determination submodule, configured to determine a cap of transmission resources to be occupied by coded modulation symbols of control information of a UCI type on the PUSCH according to a ratio coefficient corresponding to the UCI type.

For the latter case, different quantities of UCI bits correspond to respective ratio coefficients, and the first determination module includes: a second determination submodule, configured to determine a cap of transmission resources to be occupied by coded modulation symbols of control information with a quantity of UCI bits on the PUSCH according to a ratio coefficient corresponding to the quantity of UCI bits.

According to the embodiments of the present disclosure, three examples of the specific implementation of the first determination module 31 are provided hereinafter.

In the first example, the first determination module includes: a third determination submodule, configured to calculate, when a HARQ-ACK is mapped onto a PUSCH with or without UL-SCH data, a cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

where X represents a cap value of the quantity of coded modulation symbols of the HARQ-ACK in each transport layer, ratio represents the ratio coefficient, $M_{sc}^{\Phi^{UCI}}(l) = |\Phi_l^{UCI}|$ represents a quantity of elements in a set $\Phi_l^{UCI}$, $\Phi_l^{UCI}$ is a set of resource units available for transmitting UCI in an OFDM symbol l, l=0, 1, 2, . . . , $N_{symb,all}^{PUSCH}-1$, and $N_{symb,all}^{PUSCH}$ is a quantity of all OFDM symbols included in the PUSCH and includes a quantity of all symbols occupied by a DMRS.

In the second example, the first determination module includes: a fourth determination submodule, configured to calculate, when a CSI part 1 is mapped onto a PUSCH with UL-SCH data, a cap of a quantity of coded modulation symbols of the CSI part 1 in each transport layer according to the following formula:

$$X = \left| \left[ \left( \sum_{l=0}^{N_{symb,all}^{PUSCH}-1} M_{sc}^{\Phi^{UCI}}(l) \right) \times \text{ratio} \right] - Q'_{ACK} \right|, \text{ or}$$

$$X = \left| \left[ \left( \sum_{l=0}^{N_{symb,all}^{PUSCH}-1} M_{sc}^{\Phi^{UCI}}(l) \right) - Q'_{ACK} \right) \times \text{ratio} \right|,$$

where X represents a cap value of the quantity of coded modulation symbols of the CSI part 1 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $$Q'_{ACK} = \sum_{l=0}^{N_{symb,all}^{PUSCH}-1} \overline{M}_{sc,rvd}^{\Phi}(l),$$

where $\overline{\Phi}_l^{rvd}$ is a set of reserved resource units available for transmitting the HARQ-ACK in an OFDM symbol l, l=0, 1, 2, ..., $N_{symb,all}^{PUSCH}-1$, and $\overline{M}_{sc,rvd}^{\Phi}(l)=|\overline{\Phi}_l^{rvd}|$ represents a quantity of elements in $\overline{\Phi}_l^{rvd}$; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

In the third example, the first determination module includes: a fifth determination submodule, configured to calculate, when a CSI part 2 is mapped onto a PUSCH with UL-SCH data, a cap of a quantity of coded modulation symbols of the CSI part 2 in each transport layer according to the following formula:

$$X = \left| \left[ \left( \sum_{l=0}^{N_{symb,all}^{PUSCH}-1} M_{sc}^{\Phi^{UCI}}(l) \right) \times \text{ratio} \right] - Q'_{ACK} - Q'_{CSI,1} \right|, \text{ or}$$

$$X = \left| \left[ \left( \sum_{l=0}^{N_{symb,all}^{PUSCH}-1} M_{sc}^{\Phi^{UCI}}(l) \right) - Q'_{ACK} - Q'_{CSI,1} \right) \times \text{ratio} \right|,$$

where X represents a cap value of the quantity of coded modulation symbols of the CSI part 2 in each transport layer, and ratio represents the ratio coefficient;

if an quantity of information bits of a HARQ-ACK is greater than 2, $Q'_{ACK}$ represents a quantity of coded modulation symbols of transmission of the HARQ-ACK in each transport layer of the PUSCH;

if the quantity of information bits of the HARQ-ACK is 1 or 2, $Q'_{ACK}=0$;

$Q'_{CSI,1}$ represents a quantity of coded modulation symbols of transmission of a CSI part 1 in each transport layer of the PUSCH; and $M_{sc}^{\Phi^{UCI}}(l)=|\Phi_l^{UCI}|$ represents a quantity of elements in a set $\Phi_l^{UCI}$, where $\Phi_l^{UCI}$ is a set of resource units available for transmitting UCI in an OFDM symbol l, l=0, 1, 2, ..., $N_{symb,all}^{PUSCH}-1$, and $N_{symb,all}^{PUSCH}$ is a quantity of all OFDM symbols included in the PUSCH and includes a quantity of all symbols occupied by a DMRS.

$N_{symb,all}^{PUSCH}$ is a maximum quantity $N_{symb,max}^{UCI}$ of OFDM symbols used for transmitting the HARQ-ACK on the PUSCH, and $N_{symb,max}^{UCI}$ is a value predefined in a protocol or configured by a base station by using higher layer signaling and is less than or equal to $N_{symb,all}^{PUSCH}$.

The foregoing implementations of the method of determining a cap of transmission resources available for control information are all applicable to the embodiment of the apparatus of determining a cap of transmission resources available for control information, and can achieve the same technical effects.

It needs to be noted that many functional components described in this specification are referred to as modules/submodules, to particularly emphasize the independence of their implementations.

In the embodiments of the present disclosure, the module/submodule may be implemented by software, so as to be executed by various types of processors. For example, an identified executable code module may include one or more physical or logical blocks of computer instructions, and may, for instance, be constructed as an object, a process or a function. Nevertheless, executable codes of the identified module do not need to be physically located together, but may include different instructions stored in different physical blocks. When logically combined, these instructions constitute a module and achieve the specified purpose of the module.

In practice, the executable code module may be a single instruction or a plurality of instructions, and may even be distributed over a plurality of different code segments, distributed among different programs, or distributed across multiple storage devices. Similarly, operation data may be identified within the module and may be implemented in any suitable form and organized in any suitable type of data structure. The operation data may be collected as a single data set or may be distributed at different positions (including different storage devices) and at least in part, may only exist in a system or network as electronic signals.

When the module can be implemented by software, taking account of the level of hardware process in the related art, those skilled in the art can construct a hardware circuit to achieve a function corresponding to the module capable of being implemented by software, without considering the cost. The hardware circuit includes a conventional very large scale integration (VLSI) circuit or a gate array and conventional semiconductor devices such as a logic chip and a transistor or other discrete components. The module may also be implemented by a programmable hardware device, such as a field programmable gate array, a programmable array logic and a programmable logic device.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A method of determining a cap of transmission resources available for control information, applied to a communication device, comprising:

calculating, according to a ratio coefficient, a cap of a quality of coded modulation symbols of control information on a physical uplink shared channel (PUSCH);
wherein the calculating, according to the ratio coefficient, the cap of the quantity of coded modulation symbols of control information on the PUSCH comprises:
calculating, when a hybrid automatic repeat request acknowledgement (HARQ-ACK) is mapped onto a PUSCH with or without uplink-shared channel (UL-SCH) data, the cap of a quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

wherein X represents the cap value of the quantity of coded modulation symbols of the HARQ-ACK in each transport layer, $\lceil\ \rceil$ represents a ceiling function, × represents a multiplication sign, ratio represents the ratio coefficient, $M_{sc}^{\Phi^{UCI}}(l)=|\Phi_l^{UCI}|$ represents a quantity of elements in a set $\Phi_l^{UCI}$, | | represents an absolute function, $\Phi_l^{UCI}$ is a set of resource units available for transmitting the uplink control information (UCI) in an orthogonal frequency-division multiplexing (OFDM) symbol l, l=0, 1, 2, . . . , $N_{symb,all}^{PUSCH}-1$ and $N_{symb,all}^{PUSCH}$ is a quantity of all the OFDM symbols of the PUSCH and comprises a quantity of all symbols occupied by a demodulation reference signal (DMRS);
or,
wherein the calculating, according to the ratio coefficient, the cap of the quantity of coded modulation symbols of control information on the PUSCH comprises:
calculating, when a channel state information (CSI) part 1 is mapped onto the PUSCH with uplink-shared channel (UL-SCH) data, the cap of the quantity of coded modulation symbols of the CSI part 1 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK},$$

wherein X represents the cap value of the quantity of coded modulation symbols of the CSI part 1 in each transport layer, $\lceil\ \rceil$ represents a ceiling function, × represents a multiplication sign, and ratio represents the ratio coefficient;
if an quantity of information bits of a hybrid automatic repeat request acknowledgement (HARQ-ACK) is greater than 2, $Q'_{ACK}$ represents a quantity of coded modulation symbols of the HARQ-ACK in each transport layer of the PUSCH;
if the quantity of information bits of the HARQ-ACK is 1 or 2, $$Q'_{ACK} = \sum_{l=0}^{N_{symb,all}^{PUSCH}-1} \overline{M}_{sc,rvd}^{\overline{\Phi}}(l),$$

wherein $\overline{\Phi}_l^{rvd}$ is a set of reserved resource units available for transmitting the HARQ-ACK in an orthogonal frequency-division multiplexing (OFDM) symbol l, l=0, 1, 2, . . . , $N_{symb,all}^{PUSCH}-1$, and $\overline{M}_{sc,rvd}^{\overline{\Phi}}(l)=|\overline{\Phi}_l^{rvd}|$ represents a quantity of elements in $\overline{\Phi}_l^{rvd}$; | | represents an absolute function, and
$M_{sc}^{\Phi^{UCI}}(l)=|\Phi_l^{UCI}|$ represents a quantity of elements in a set $\Phi_l^{UCI}$, wherein | | represents an absolute function, $\Phi_l^{UCI}$ is a set of resource units available for transmitting the UCI in the OFDM symbol l, l=0, 1, 2, . . . , $N_{symb,all}^{PUSCH}-1$, and $N_{symb,all}^{PUSCH}$ is a quantity of all the OFDM symbols of the PUSCH and comprises a quantity of all symbols occupied by a demodulation reference signal (DMRS);
or,
wherein the calculating, according to the ratio coefficient, the cap of the quantity of coded modulation symbols of control information on the PUSCH comprises:
calculating, when a channel state information (CSI) part 2 is mapped onto the PUSCH with uplink-shared channel (UL-SCH) data, the cap of the quantity of coded modulation symbols of the CSI part 2 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1},$$

wherein X represents the cap value of the quantity of coded modulation symbols of the CSI part 2 in each transport layer, $\lceil\ \rceil$ represents a ceiling function, × represents a multiplication sign, and ratio represents the ratio coefficient;
if an quantity of information bits of a hybrid automatic repeat request acknowledgement (HARQ-ACK) is greater than 2, $Q'_{ACK}$ represents a quantity of coded modulation symbols of the HARQ-ACK in each transport layer of the PUSCH;
if the quantity of information bits of the HARQ-ACK is 1 or 2, $Q'_{ACK}=0$;
$Q_{CSI,1}$ represents a quantity of coded modulation symbols of a CSI part 1 in each transport layer of the PUSCH; and
$M_{sc}^{\Phi^{UCI}}(l)=|\Phi_l^{UCI}|$ represents a quantity of elements in a set $\Phi_l^{UCI}$, wherein | | represents an absolute function, $\Phi_l^{UCI}$ is a set of resource units available for transmitting the UCI in an orthogonal frequency-division multiplexing (OFDM) symbol l, l=0, 1, 2, . . . , $N_{symb,all}^{PUSCH}-1$, and $N_{symb,all}^{PUSCH}$ is a quantity of all the OFDM symbols of the PUSCH and comprises a quantity of all symbols occupied by a demodulation reference signal (DMRS).

2. The method according to claim 1, wherein the ratio coefficient is a ratio coefficient configured by a base station by using higher layer signaling.

3. The method according to claim 1, wherein the calculating, according to the ratio coefficient, the cap of the quantity of coded modulation symbols of control information on the PUSCH comprises:
calculating the cap of the quantity of coded modulation symbols of control information of a type of the UCI on the PUSCH according to the ratio coefficient corresponding to the type of the UCI.

4. The method according to claim 1, wherein the calculating, according to the ratio coefficient, the cap of the quantity of coded modulation symbols of control information on the PUSCH comprises:
calculating the cap of the quantity of coded modulation symbols of control information with a quantity of bits of the UCI on the PUSCH according to the ratio coefficient corresponding to the quantity of bits of the UCI.

5. The method according to claim 1, wherein $N_{symb,all}^{PUSCH}$ is a maximum quantity $N_{symb,max}^{UCI}$ of OFDM symbols used for transmitting the UCI in the PUSCH, and $N_{symb,max}^{UCI}$ is a value predefined in a protocol or configured by a base station by using higher layer signaling and is less than or equal to $N_{symb,all}^{PUSCH}$.

6. A communication device, comprising: a processor and a storage including a program, the program stored in the storage being executed by the processor, wherein the processor is configured to execute the program to implement the following step:
calculating, according to a ratio coefficient, a cap of a quantity of coded modulation symbols of control information on a physical uplink shared channel (PUSCH);
wherein the processor is specifically configured to execute the program to implement the following step:
calculating, when a hybrid automatic repeat request acknowledgement (HARQ-ACK) is mapped onto the PUSCH with or without uplink-shared channel (UL-SCH) data, the cap of the quantity of coded modulation symbols of the HARQ-ACK in each transport layer according to the following formula:

$$X = \left\lceil \sum_{l=0}^{N_{symb,all}^{PUSCH}-1} M_{sc}^{\Phi^{UCI}}(l) \times \text{ratio} \right\rceil,$$

wherein X represents the cap value of the quantity of coded modulation symbols of the HARQ-ACK in each transport layer, $\lceil \ \rceil$ represents a ceiling function, × represents a multiplication sign, ratio represents the ratio coefficient, $M_{sc}^{\Phi^{UCI}}(l)=|\Phi_l^{UCI}|$ represents a quantity of elements in a set $\Phi_l^{UCI}$, $|\ |$ represents an absolute function, $\Phi_l^{UCI}$ is a set of resource units available for transmitting the uplink control information (UCI) in an orthogonal frequency-division multiplexing (OFDM) symbol l, l=0, 1, 2, . . . , $N_{symb,all}^{PUSCH}-1$ and $N_{symb,all}^{PUSCH}$ is a quantity of all the OFDM symbols of the PUSCH and comprises a quantity of all symbols occupied by a demodulation reference signal (DMRS);
or,
the processor is specifically configured to execute the program to implement the following step:
calculating, when a channel state information (CSI) part 1 is mapped onto the PUSCH with uplink-shared channel (UL-SCH) data, the cap of the quantity of coded modulation symbols of the CSI part 1 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK},$$

wherein X represents the cap value of the quantity of coded modulation symbols of the CSI part 1 in each transport layer, $\lceil \ \rceil$ represents a ceiling function, × represents a multiplication sign, and ratio represents the ratio coefficient;
if an quantity of information bits of a hybrid automatic repeat request acknowledgement (HARQ-ACK) is greater than 2, $Q'_{ACK}$ represents a quantity of coded modulation symbols of the HARQ-ACK in each transport layer of the PUSCH;
if the quantity of information bits of the HARQ-ACK is 1 or 2, $$Q'_{ACK} = \sum_{l=0}^{N_{symb,all}^{PUSCH}-1} \overline{M}_{sc,rvd}^{\overline{\Phi}}(l),$$

wherein $\overline{\Phi}_l^{rvd}$ is a set of reserved resource units available for transmitting the HARQ-ACK in an orthogonal frequency-division multiplexing (OFDM) symbol l, l=0, 1, 2, . . . , $N_{symb,all}^{PUSCH}-1$, and $\overline{M}_{sc,rvd}^{\overline{\Phi}}(l)=|\overline{\Phi}_l^{rvd}|$ represents a quantity of elements in $\overline{\Phi}_l^{rvd}$; $|\ |$ represents an absolute function, and
$M_{sc}^{\Phi^{UCI}}(l)=|\Phi_l^{UCI}|$ represents a quantity of elements in a set $\Phi_l^{UCI}$, wherein $|\ |$ represents an absolute function, $\Phi_l^{UCI}$ is a set of resource units available for transmitting the UCI in the OFDM symbol l, l=0, 1, 2, . . . , $N_{symb,all}^{PUSCH}-1$, and $N_{symb,all}^{PUSCH}$ is a quantity of all the OFDM symbols of the PUSCH and comprises a quantity of all symbols occupied by a demodulation reference signal (DMRS);
or,
the processor is specifically configured to execute the program to implement the following step:
calculating, when a channel state information (CSI) part 2 is mapped onto the PUSCH with uplink-shared channel (UL-SCH) data, the cap of the quantity of coded modulation symbols of the CSI part 2 in each transport layer according to the following formula:

$$X = \left\lceil \left( \sum_{l=0}^{N_{symb,all}^{PUSCH}-1} M_{sc}^{\Phi^{UCI}}(l) \right) \times \text{ratio} \right\rceil - Q'_{ACK} - Q'_{CSI,1},$$

wherein X represents the cap value of the quantity of coded modulation symbols of the CSI part 2 in each transport layer, $\lceil \ \rceil$ represents a ceiling function, × represents a multiplication sign, and ratio represents the ratio coefficient;
if an quantity of information bits of a hybrid automatic repeat request acknowledgement (HARQ-ACK) is greater than 2, $Q'_{ACK}$ represents a quantity of coded modulation symbols of the HARQ-ACK in each transport layer of the PUSCH;
if the quantity of information bits of the HARQ-ACK is 1 or 2, $Q'_{ACK}=0$;
$Q_{CSI,1}$ represents a quantity of coded modulation symbols of a CSI part 1 in each transport layer of the PUSCH; and
$M_{sc}^{\Phi^{UCI}}(l)=|\Phi_l^{UCI}|$ represents a quantity of elements in a set $\Phi_l^{UCI}$, wherein $|\ |$ represents an absolute function, $\Phi_l^{UCI}$ is a set of resource units available for transmitting the UCI in an orthogonal frequency-division multiplexing (OFDM) symbol l, l=0, 1, 2, . . . , $N_{symb,all}^{PUSCH}-1$, and $N_{symb,all}^{PUSCH}$ is a quantity of all the OFDM symbols of the PUSCH and comprises a quantity of all symbols occupied by a demodulation reference signal (DMRS).

7. The communication device according to claim 6, wherein the ratio coefficient is a ratio coefficient configured by a base station by using higher layer signaling.

8. The communication device according to claim 6, wherein the processor is specifically configured to execute the program to implement the following step:

calculating the cap of the quantity of coded modulation symbols of control information of a type of the UCI on the PUSCH according to the ratio coefficient corresponding to the type of the UCI.

9. The communication device according to claim 6, wherein the processor is specifically configured to execute the program to implement the following step:

calculating the cap of the quantity of coded modulation symbols of control information with a quantity of bits of the UCI on the PUSCH according to the ratio coefficient corresponding to the quantity of bits of the UCI.

10. The communication device according to claim 6, wherein $N_{symb,all}^{PUSCH}$ is a maximum quantity $N_{symb,max}^{UCI}$ of OFDM symbols used for transmitting the UCI on the PUSCH, and $N_{symb,max}^{UCI}$ is a value predefined in a protocol or configured by a base station by using higher layer signaling and is less than or equal to $N_{symball}^{PUSCH}$.

11. A non-transitory computer-readable storage medium storing therein a computer program, wherein the program is configured to be executed by a processor, to implement the method of determining the cap of transmission resources available for control information according to claim 1.

12. The method according to claim 1, wherein the ratio coefficient is greater than or equal to 0 and is less than 1.

13. The communication device according to claim 6, wherein the ratio coefficient is greater than or equal to 0 and is less than 1.

\* \* \* \* \*